United States Patent
Herges et al.

(10) Patent No.: US 12,436,135 B2
(45) Date of Patent: Oct. 7, 2025

(54) ANALYTICAL PROCESS FOR DETECTING PEROXIDE-, NITRATE-, NITRAMINE-, AND NITROTOLUENE-BASED EXPLOSIVES

(71) Applicant: Christian-Albrechts-Universität zu Kiel, Kiel (DE)

(72) Inventors: Rainer Herges, Kiel (DE); Morten Peters, Kiel (DE); Mike Brockmann, Kiel (DE)

(73) Assignee: Christian-Albrechts-Universität zu Kiel, Kiel (DE)

( * ) Notice: Subject to any disclaimer, the term of this patent is extended or adjusted under 35 U.S.C. 154(b) by 696 days.

(21) Appl. No.: 17/291,389

(22) PCT Filed: Mar. 30, 2021

(86) PCT No.: PCT/EP2021/058279
§ 371 (c)(1),
(2) Date: May 5, 2021

(87) PCT Pub. No.: WO2021/198249
PCT Pub. Date: Oct. 7, 2021

(65) Prior Publication Data
US 2022/0308027 A1 Sep. 29, 2022

(30) Foreign Application Priority Data
Apr. 1, 2020 (EP) .................... 20167599

(51) Int. Cl.
*G01N 31/22* (2006.01)
*G01N 21/78* (2006.01)

(52) U.S. Cl.
CPC .......... *G01N 31/228* (2013.01); *G01N 21/78* (2013.01); *G01N 31/227* (2013.01); *Y10T 436/206664* (2015.01)

(58) Field of Classification Search
CPC .... G01N 31/228; G01N 21/78; G01N 31/227; G01N 31/224; G01N 33/0057; Y10T 436/206664
See application file for complete search history.

(56) References Cited

U.S. PATENT DOCUMENTS 5,480,612 A    1/1996  Margalit
6,096,557 A *  8/2000  Tanaka ................. G01N 31/223
                                                       436/100
(Continued)

FOREIGN PATENT DOCUMENTS

EP    0586125 A2    8/1993
JP    63250565 A  * 10/1988
(Continued)

OTHER PUBLICATIONS

Henning, T.P. et al. "Porphyrin and Microperoxide Metal Derivatives Applied to a Peroxide Biosensor," Electrochemical Society Proceedings vol. 99-5 (1999), 144-151 (Year: 1999).*

(Continued)

*Primary Examiner* — Jennifer Wecker
*Assistant Examiner* — Michelle Adams
(74) *Attorney, Agent, or Firm* — Greer, Burns & Crain, Ltd.; Steven P. Fallon (57) ABSTRACT

An analytical process for detecting compounds in a sample suspected of containing a peroxide-based compound, a nitrate-based compound, a nitrotoluene-based compound, or a nitramine-based compound includes treating the sample with a superbase and then contacting the sample with a composition. The composition includes or consists of a Ni-porphyrin and an acid and optionally an acid stable solvent.

18 Claims, 3 Drawing Sheets

(56) References Cited

U.S. PATENT DOCUMENTS

| | | |
|---|---|---|
| 6,245,758 B1 | 6/2001 | Stern et al. |
| 7,799,573 B2 | 9/2010 | Deans et al. |
| 11,577,928 B2 | 2/2023 | Ruhm |
| 2007/0148696 A1* | 6/2007 | Fiorini-Debuisschert ............ B01J 20/268 435/7.1 |
| 2010/0081205 A1 | 4/2010 | Zeinali et al. |

FOREIGN PATENT DOCUMENTS

| | | |
|---|---|---|
| JP | 0474964 A | 3/1992 |
| WO | 9943846 | 9/1999 |
| WO | 2005089058 A2 | 9/2005 |
| WO | 2008130376 A2 | 10/2008 |
| WO | 2010086834 A2 | 8/2010 |
| WO | 2013022494 A2 | 2/2013 |

OTHER PUBLICATIONS

Reedy, C.J. et al. "Heme Protein Assemblies," Chem. Rev. 2004, 104, 2, 617-650 (Year: 2004).*

Lin et al., "A Colorimetric Sensor Array for Detection of Triacetone Triperoxide Vapor", JACS Communications, 2010, pp. 15519-15521, vol. 132, American Chemical Society.

Schulte-Ladbeck et al., "A field test for the detection of peroxide-based explosives", Analyst, 2002, pp. 1152-1154, vol. 127, The Royal Society of Chemistry.

Du et al., "Complete Quenching of the Pd3(dppm)3(CO)2+ Cluster Emission Via Electrostatic Host-Guest Assemblies with Carboxylate-Containing Tetraphenylporphyrins of Ni(II) and Fe(III)", Journal of Cluster Science, 2012, pp. 737-751, vol. 23, Springer.

Chahal et al., "Switching between porphyrin, porphodimethene and porphyrinogen using cyanide and fluoride ions mimicking volatile molecular memory and and the 'NOR' logic gate", Dalton Transactions, 2016, pp. 16404-16412, vol. 45, The Royal Society of Chemistry.

Wang et al., "Recent Advances in Porphyrin-Derived Sensors", Current Organic Chemistry, 2013, pp. 3078-3091, vol. 17, No. 24, Bentham Science Publishers.

Cong et al., "Synthesis, Electrochemistry, and Reversible Interconversion among Perhalogenated Hydroxyphenyl Ni(II) Porphyrins, Porphodimethenes, and Porpho-5, 15-bis-paraquinone Methide", Inorganic Chemistry, 2019, pp. 14361-14376, vol. 58, ACS Publications.

Chahal et al., "β-Dicyanovinyl substituted porphyrinogen: synthesis, a reversible sensor for picric acid among explosives and a unique sensor for cyanide and fluoride ions by switching between various porphyrinoid states", Dalton Transactions, 2017, pp. 11669-11678, vol. 46, The Royal Society of Chemistry.

Amas, et al., "The Detection of Dinitro and Trinitro Aromatic Bodies in Industrial Blasting Explosives", Analyst, 1966, vol. 91, pp. 336-337.

Germain, et al., "Optical explosives detection: from color changes to fluorescence turn-on", Chemical Society Reviews, 2009, vol. 38, pp. 2543-2555.

Jarczewski, et al., "Kinetic isotope effect and tunnelling in the proton transfer reaction between 2,4,6-trinitrotoluene and 1,1',3,3'-tetramethylguanidinien dimethylformamide solvent", Can. J. Chem., 1979, vol. 57, pp. 669-672.

Matos, et al., "Porphyrin interaction with the membrane: the use of membrane models to elicit the diverse partition in normal and neoplastic tissue", Med Chem Res, 2015, vol. 24, pp. 3885-3891.

International Search Report from the corresponding International Patent Application No. PCT/EP2021/058279, dated Jul. 2, 2021.

International Preliminary Report on Patentability from the corresponding International Patent Application No. PCT/EP2021/058279, dated Sep. 29, 2022.

Anusha, et al., "Nonlinear absorption and excited state dynamics of porphyrin and phthalocyanine in the presence of explosive molecules", Chemical Physics Letters 641, 2015, pp. 23-28.

Armijo, et al., "Electrocatalytic reduction of nitrate ion on Cu and Ni poly-tetraaminophenylporphyrin-modified electrodes", Journal of Electroanalytical Chemistry 566, 2004, pp. 315-322.

Catalano, et al,. "Control of Reactivity at the Porphyrin Periphery by Metal Ion Co-ordination: a General Method for Specific Nitration at the fi-Pyrrolic Position of 5,10,15,20-Tetraarylporphyrins", J . Chem. Soc., Chem. Commun., 1984, pp. 1535-1536.

Chahal, et al., "Beta-Dicyanovinyl substituted porphyrinogen: synthesis, a reversible sensor for picric acid among explosives and a unique sensor for cyanide and fluoride ions by switching between various porphyrinoid states", Dalton Trans., 2017, 46, pp. 11669-11678.

Chen, et al., "Poly[meso-tetrakis(2-thienyl)porphyrin] for the sensitive electrochemical detection of explosives", Sensors and Actuators B 147, 2010, pp. 191-197.

Deenadayalan, et al., "Visible-Light-Assisted Photocatalytic Reduction of Nitroaromatics by Recyclable Ni(II)-Porphyrin Metal-Organic Framework (MOF) at RT", Inorg. Chem., 2016, 55, 11, pp. 5320-5327.

Guillen, et al., "Molecular-based selection of porphyrins towards the sensing of explosives in the gas phase", Sensors and Actuators B 260, 2018, pp. 116-124.

Hennig, et al., "Porphyrin and Microperoxidase Metal Derivatives Applied to a Peroxide Biosensor", Electrochemical Society Proceedings vol. 99-5, 1999, pp. 144-151.

Johnson, et al., "Fluorescent Silicate Materials for the Detection of Paraoxon", Sensors, 2010, 10, pp. 2315-2331.

Kielmann, et al., "Porphyrins in troubled times: a spotlight on porphyrins and their metal complexes for explosives testing and CBRN defense", New J. Chem., 2016, 42, pp. 7529-7550.

Ma, et al., "Fluorescent Porous Film Modified Polymer Optical Fiber via "Click" Chemistry: Stabke Dye Dispersion and Trace Explosive Detection", ACS Appl. Mater. Interfaces, 2015, 7, pp. 241-249.

Reedy, et al., "Heme Protein Assemblies", Chem. Rev., 2004, 104, pp. 617-649.

Swamy P., et al., "Polyfunctional Lewis Acids: Intriguing Solid-State Structure and Selective Detection and Discrimination of Nitroaromatic Explosives", Chem. Eur. J., 2015, 21, pp. 8874-8882.

Tao, et al., "Metalloporphyrins as sensing elements for the rapid detection of trace TNT vapor", J. Mter. Chem., 2006, 16, pp. 4521-4528.

Venkatramaiah, et al., "Phosphonate Appended Porphyrins as Versatile Chemosensors for Selective Detection of Trinitrotoluene", Analytical Chemistry, 2015, 87, pp. 4515-4522.

Wang, et al., "Recent Advances in Porphyrin-Derived Sensors", Current Organic Chemistry, 2013, 17, 3078-3091.

Yang, et al., "Rapid and Specific Aqueous-Phase Detection of Nitroaromatic Explosives with Inherent Porphyrin Recognition Sites in Metal-Organic Frameworks", ACS Appl. Mater. Interfaces, 2015, 7, pp. 11956-11964.

* cited by examiner

Fig. 1

Peroxides

Nitrate esters, nitramines

ANALYTICAL PROCESS FOR DETECTING PEROXIDE-, NITRATE-, NITRAMINE-, AND NITROTOLUENE-BASED EXPLOSIVES

PRIORITY CLAIM

This application is a 35 U.S.C. 371 US National Phase and claims priority under 35 U.S.C. § 119, 35 U.S.C. 365 (b) and all applicable statutes and treaties from prior PCT Application PCT/EP2021//058279, which was filed Mar. 30, 2021, which application claimed priority from EP Application Serial No. 20167599.8, which was filed Apr. 1, 2020.

FIELD OF THE INVENTION

A field of the invention concerns analytical processes for detecting several classes of compounds, especially peroxide-, oxyhalide anion-, and nitrogen-based compounds, which preferably are explosives. These compounds especially include: 1. Peroxide-based compounds, especially peroxide-based explosives, e.g. triacetone triperoxide (TATP), diacetone diperoxide (DADP), methyl ethyl ketone peroxide (MEKP), hexamethylene triperoxide diamine (HMTD), 2. Oxyhalide anions, especially chlorates (e.g. sodium chlorate ($NaClO_3$) potassium chlorate ($KClO_3$) or bromates, e.g. sodium bromate ($NaBrO_3$) 3. Inorganic nitrates (nitrate salts) e.g. potassium nitrate ($KNO_3$), ammonium nitrate ($NH_4NO_3$), urea nitrate ($NH_2COHNH_2* \cdot NO_3^-$), 4. Organic nitrates (nitrate esters) e.g. nitroglycerine (NG), ethylene glycol dinitrate (EGDN), pentaerythritol tetranitrate (PETN), 5. Nitramines, e.g. 1,3,5-trinitro-1,3,5-triazinane (hexogen, RDX), 1,3,5,7-tetranitro-1,3,5,7-tetrazoctane (octogen, HMX), 2,4,6-trinitrophenylmethylnitramine (tetryl) and/or nitrourea ($NH_2CONHNO_2$) and 6. Nitrotoluenes e.g. 2,4-dinitrotoluene (DNT) or 2,4,6-trinitrotoluene (TNT).

BACKGROUND

Detection kits might contain several reagents or host compounds to cover a wider range of classes of explosives and to differentiate between them. Chemical methods usually need sample preparation. There are several methods for the chemical detection of nitrogen-based explosives; however, there is only a limited number of colorimetric detection methods for peroxide-based explosives:

WO 99/43846 (Ehud Keinan und Harel Itzhaky) describes a colorimetric method and kit for the detection of peroxide based explosives (cyclic peroxides), such as triacetone peroxide (TATP), diacetone peroxide (DADP) and hexamethylene triperoxide diamine (HMTD). Peroxide detection is based on a two-step process. The first step involves dissolution of the suspected material in an organic solvent and the hydrolysis of the cyclic peroxide with strong acids into acetone and hydrogen peroxide. In the second step, the acidic solution is neutralized with a buffer and the hydrogen peroxide is detected by the color change of a redox active dye oxidized by the hydrogen peroxide and a peroxidase enzyme. The patent includes a kit for the practical use of the invention including an organic solvent, a strong acid, a solution of the buffer, a peroxidase enzyme and the redox active dye. The reason for this rather complicated detection procedure is the fact that a strong acid is needed for the cleavage of the cyclic peroxide (explosive), however, the actual colorimetric detection can only be performed at neutral pH. Therefore, neutralization of the solution is necessary as an intermediate step.

Lin and Suslick, J. Am. Chem. Soc. 15519-15521 (2010) for colorimetrically detecting TATP describe a process in which a gaseous sample flows through a bed of the acid form of a sulfonated highly cross-linked polystyrene ion-exchange resin Amberlyst 15 to achieve acid hydrolysis, with subsequent contacting the reaction products with an array of redox dyes. Since the acid is immobilized in the porous, solid resin, and cleavage of the cyclic peroxide occurs in the gas phase inside the resin, a separate neutralization step is avoided. However, the disadvantage of this procedure is the fact, that only volatile explosives (TATP and DADP) can be detected. Moreover, to develop a sufficient vapour pressure for detection, TATP and DADP must be placed in a container or at least at a place with minimal air exchange. Hexamethylene triperoxide diamine (HMTD), which has a higher sublimation point and a lower vapor pressure as compared to TATP and DADP, cannot be detected. Advantage of the method is the fact that TATP can be discriminated from other oxidizing agents such as hydrogen peroxide and hydroperoxides by exposing the vapor after solid acid hydrolysis to an array of redox active dyes with different reactivities.

Amisar in WO 2005/089058 A2 described a method for the detection of chlorate, bromate and/or organic peroxides. The detection kit includes two containers, including an organic solvent, strong acid, an aromatic amine and a transition metal ion.

In a follow-up patent WO 2010/086834 Amisar describes a sequential procedure that includes several steps and several reagents to detect 1. perchlorates, 2. nitroaromatic compounds, 3. nitramines, nitroester, chlorate and bromate, 4. peroxides, 5. nitrates from the same sample.

Schulte-Ladbeck et al., Analyst 1152-1154 (2002) for detecting TATP or HMTD describe the addition of catalase to a liquid test sample for removal of free hydrogen peroxide, followed by extraction with acetonitrile to remove the catalyst, and subsequently irradiating the sample with UV in order to decompose the peroxide-based compounds, and in an enzyme-catalysed reaction colorimetrically detecting the hydrogen peroxide generated by the decomposition reaction.

U.S. Pat. No. 7,799,573 B2, Detection of explosives and other species, describes the detection of peroxide-based explosives by acid or light induced decomposition to hydrogen peroxide and subsequent detection of the hydrogen peroxide by reaction with oxalic acid esters and detection of the chemiluminescence thereof.

M. K. Chahal, M. Sankar, Dalton Trans. 2016, 45, 16404-16412 describes synthesis of Ni-porphyrins (Ni-tetra(4-hydroxyphenyl) porphyrins).

M. K. Chahal, M. Sankar, Dalton Trans. 2017, 46, 11669-11678 describes the detection of cyanide ($CN^-$), fluoride ($F^-$) and picric acid using as sensor compound Ni-porphyrins (Ni-tetra(4-hydroxyphenyl) porphyrins).

Without relation to use in detecting explosives, Cong et al., Inorganic Chemistry 14361-14376 (2019) describes perhalogenated Ni-porphyrin compounds.

Without relation to use in detecting explosives, B. Du, A. Langlois, D. Fortin, C. Stern, P. D. Harvey, J. Clust. Sci. 2012, 23, 737-751 describes Ni-porphyrin compounds, which when substituted with an acid group have a $pK_a$ 4.2.

Without relation to use in detecting explosives, C. Matos, C. Ribeiro, L. R. Gomes, Med. Chem. Res. 2015, 24, 3885-3891 describes the interaction of an acid substituted porphyrin (meso-tetra(4-carboxyphenyl) porphine) with model membranes.

Optical detection methods of nitroaromatics, nitramines and nitrate esters are reviewed in "Optical explosives detection: from color changes to fluorescence turn-on, Germain, M. E.; Knapp, M. J. Chem. Soc. Rev. 2009, 38, 2543). Methods to detect nitrogen-based explosives such as inorganic nitrates, organic nitrates and nitramines have been described in: Method and kit for detecting explosives, Margalit, Y. Eur. Pat. Appl. (1994), EP 586125 A2 and U.S. Pat. No. 5,480,612.

WO 2008/130376 A2 (Determination of explosives including RDX) presents methods to detect nitramines, e.g. RDX and PETN using dyes such as 9,10-didehydroacridine or 9,10-didehydroanthracene derivatives that act as a hydride donors upon irradiation with UV light, reducing the nitramines, thereby being converted to fully conjugated acridine or anthracene derivatives. Detection is performed by observation of changes in absorption or emission.

WO 2013/022494 (Detection of analytes including nitro-containing analytes) describes a variation of WO 2008/130376 A2 wherein the decomposition products after irradiation with UV light react via electrophilic aromatic substitution of electron rich aromatic compounds. Detection is based on an optical signal, which may be a change in absorption or emission.

A. D. Jarczewski, P. Pruszynski, K. T. Leffek, Can. J. Chem. 1979, 57, 669-672. 2. S. A. H. Amas, H. J. Yallop, Analyst 196691, 336-337 describes that nitrotoluenes, e.g. 2,4-dinitrotoluene (DNT) or 2,4,6-trinitrotoluene (TNT), immediately give rise to a blue (DNT) or a purple color (TNT) upon treatment with an organic superbase.

None of these papers or patents describes a general colorimetric method (detection based on an optical signal) to detect peroxide-based explosives, oxyhalide anions, nitramines, nitrate esters and/or nitrate salts with the same reagent. None of the published methods reports on a colorimetric method to detect peroxide-based explosives (cyclic peroxides) in one stage without a separate activation step using acid, base or UV light.

SUMMARY OF THE INVENTION

An preferred analytical process for detecting compounds in a sample suspected of containing a peroxide-based compound, a nitrate-based compound, a nitrotoluene-based compound, or a nitramine-based compound, includes treating the sample with a superbase and then contacting the sample with a composition, wherein the composition includes or consists of a Ni-porphyrin and an acid.

The preferred analytical processes of the invention provide high sensitivity, do not require sample preparation, and detect the most relevant classes of explosive compounds with the same reagent in one or two steps by a simple chemical color test. The preferred process can detect peroxide-oxyhalide anion- and nitrogen-based explosives, with high sensitivity and without or with only one step of pre-treatment of a sample prior to a color reaction that can be detected visually, preferably without spectrophotometric detection. The preferred analytical process can be performed at ambient conditions within a short time, e.g. within 60 s, within 30 s, within 20 s, or less. A preferred process can be conducted simple-to-use device containing the reactants for use in the analytical process.

BRIEF DESCRIPTION OF THE DRAWINGS

The invention is described in greater detail by way of examples with reference to FIG. 1 that shows a reaction mechanism according to the invention, FIG. 2 that shows UV spectra of the reaction product obtained by the analytical process. The UV spectra shown in FIG. 2 are superimposed of a composition according to the invention of Ni-tetrakis(trimethoxyphenyl) porphyrin and trifluoroacetic acid (TFA), of the reaction product of this composition according to the invention with TATP after 2.3 min as indicated, and of the reaction product of this composition according to the invention with TATP after 12.5 min. The UV spectra prove that the Soret and Q band, which are characteristic for the Ni-porphyrin, decrease in the presence of TATP and a broad band between 550 and 700 nm is built up, which band is typical for the porphyrin radical cation, and FIG. 3 which shows test stripes as an embodiment of the invention.

DETAILED DESCRIPTION OF THE PREFERRED EMBODIMENTS

A preferred analytical process treats the sample with an organic superbase, for detecting in a sample as the analytes peroxide-based explosives, oxyhalide anion-based explosives, nitrate-based explosives and/or nitramine-based explosives, and then contacts the sample suspected of containing a peroxide-based compound, especially a peroxide-based explosive, an oxyhalide anion-based compound, especially an oxyhalide-based explosive, a nitrate ester or a nitrate salt, especially a nitrate-based explosive, or a nitramine-based compound, with a composition including or consisting of a Ni-porphyrin, an acid and preferably an acid-stable solvent. The process does not include a separate step of hydrolysing the sample suspected of containing a peroxide-based explosive prior to contacting the sample with the composition containing the Ni-porphyrin. For the detection of nitramine-based explosives, a two-step procedure is necessary. The sample is treated with an organic superbase first, and in a second step the sample is contacted with the composition containing the Ni-porphyrin as described above. Pretreatment with the organic superbase does not interfere with the detection of peroxide, oxyhalide anion, nitrite ester and nitrate salts, and it does not impede their detection. So all compounds mentioned above can be detected by the two-step procedure, however, for the detection of nitramines, the pretreatment with organic superbase is required. Further, the invention provides the composition including the Ni-porphyrin, an acid, optionally an acid-stable solvent, for use as an analytical device in the analytical process. The acid can be present in a mixture with the Ni-porphyrin, or alternatively or additionally, the acid can be linked to the Ni-porphyrin, e.g. the acid can be a substituent to the Ni-porphyrin.

The analytical process and the composition have the advantage of allowing a differentiation between the explosives, as peroxide-based explosives and oxyhalide anions are indicated by the Ni-porphyrin finally generating green color, and that nitrate-based explosives and nitramine-based explosives are indicated by the Ni-porphyrin initially generating green color and finally generating brown color.

Further, the invention provides a device for use in the analytical process, the device including the composition including or consisting of a Ni-porphyrin, an acid and preferably an acid-stable solvent and preferably a carrier, e.g. a porous carrier, which carrier holds the Ni-porphyrin, acid and acid-stable solvent, wherein the carrier e.g. is a porous and/or swelling liquid adsorbing material that forms a gel, e.g. a membrane of an acid-stable material, e.g. of a synthetic polymer or cellulose, so that the carrier forms a supporting material for a liquid composition of the invention.

The process and the composition of the invention have the advantage of detecting explosives in one process step, because the Ni-porphyrin is acid-stable and the acid decomposes the peroxide-based explosive to generate a hydroperoxide, or hydrogen peroxide, and the nitramine or nitrate esters are decomposed to generate the nitronium ion and/or nitrogen dioxide, which react with the Ni-porphyrin to change its color. Nitramines (e.g. hexogen and octogen) react slowly under these conditions. Therefore, according to the invention, nitramines are first treated with an organic superbase (B) to eliminate nitrite according to the reaction mechanism: (—N(NO$_2$)—CH$_2$—+B→—N═CH—+BH$^+$+ NO$_2^-$). After several seconds, e.g. less than <10 s reaction time, the procedure described above is applied to detect the generated nitrite (NO$_2^-$).

It was found that the process is extremely sensitive towards peroxides, because it is catalytic in peroxide, e.g. one TATP molecule will result in the conversion of ca. 60 Ni-porphyrin molecules to the corresponding cation, which gives a color change from red to green. Nitrogen-based explosives as well accept two electrons per NO$_2$-group. For instance, nitroglycerine and hexogene are capable of oxidizing 6 equivalents of Ni-porphyrin. A high sensitivity is also provided by the fact that Ni-porphyrins exhibit extremely high molar extinction coefficients of their Soret bands. Therefore, only small amounts of the porphyrin need to be used in the invention for visual detection of a color change.

In contrast to the prior art using separate activation of the explosives, e.g. by separate acid or base hydrolysis or UV irradiation, with subsequent detection by a color reaction, the analytical process of the invention detects the above listed explosives in a reaction that only requires contacting the sample suspected of containing the peroxide-oxyhalide- or nitrogen based explosive with the composition including or consisting of Ni-porphyrin, acid and optionally acid-stable solvent.

In an embodiment, the acid can be a free acid that is present in admixture with the Ni-porphyrin and with the optional solvent, but which free acid is not covalently linked to the Ni-porphyrin. The free acid, e.g. in the form of a liquid acid, is one acid or a mixture of at least two acids. Further, the free acid can be in the form of an acid linked to a matrix, which matrix may be the carrier. The acid linked to a matrix can e.g. be a strongly acidic cation exchanger. An acid is generally active to decompose cyclic peroxides, nitramines, nitrate esters and/or nitrate salts, especially a peroxide-based explosive, a nitrate-based explosive or a nitramine-based explosive. The strong base, which is used to activate nitramines is an organic superbase, either in pure form or as a solution in an inert solvent such as acetonitrile. The pK$_a$ of this organic superbase preferably is at or above 24.

The Ni-porphyrin, preferably in at least one meso position, has electron-donating substituents, which are aryl groups, e.g. aromatic groups containing at least one phenyl ring, which optionally are substituted with at least one methoxy group, or substituted amino group, or alkyl groups, each having e.g. 1, 2, 3, 4, 5, 6, 7, 8, 9, 10, 11, or 12 carbon atoms, linear or branched or cyclic. The Ni-porphyrin can have its meso positions unsubstituted, or the Ni-porphyrin can have one, two, three or all four of its meso positions substituted, preferably with an electron-donating group, which can be the same or independently a different one for each meso position.

Generally, the acid in all embodiments preferably has a pK$_a$ value of at maximum 1.2, e.g. a pK$_a$ value of below 1.2, e.g. of −2.8 to 0.23. For example, p-toluenesulfonic acid has a pK$_a$ value of −2.8, trichloroacetic acid has a pK$_a$ value of 0.7. Generally preferred, the acid has a pK$_a$ in the range from −1.2 to 0.23. The pK$_a$ value preferably is determined at 20° C. in water. A pK$_a$ value of at maximum 1 is preferred, because it results in decomposition of peroxide-based explosives that have a cyclic structure such as TATP within 30 s or shorter, e.g. at 20° C. The pK$_a$ of the acid should preferably not be below −4 (e.g. triflic acid pK$_a$-5.1) to prevent decomposition of the Ni-porphyrin.

In an embodiment, the acid is a compound, which is in admixture with the Ni-porphyrin, preferably in an acid stable solvent. The acid can be a strong acid, e.g. having a pK$_a$ of −1.2 to 1.2 or to 0.23. The acid preferably is selected from trifluoroacetic acid (pK$_a$ 0.23), pentafluoro propionic acid (pK$_a$ 0.5-1.2), heptafluoro butyric acid (pK$_a$ 1.2) or perfluoropentanoic acid (pK$_a$ 0.5-1.2) preferably perfluoropentanoic acid, or trifluoroacetic acid, and mixtures of at least two of these.

The acid stable solvent preferably is a solvent that stabilizes cations and radical cations. The acid stable solvent can be an organic halogenated solvent, e.g. methylene chloride, chloroform, 1,1-dichloroethane, 1,2,3-trichloropropane, 1,2,3-trichloropropane, 1,1,2,3-tetrachloropropane, 1,1,1,2,3-pentachloropropane, 1,1,2,3,3-pentachloropane, fluorinated C$_2$- to C$_6$-alcohols, preferably hexafluoro isopropanol (HFIP), or sulfolane or mixtures of at least two of these.

In chlorinated solvents, the acid preferably is trifluoroacetic acid (TFA), pentafluoro propionic acid, heptafluorobutyric acid, or perfluoropentanoic acid. In chlorinated solvents, in fluorinated alcohols, e.g. in HFIP, or in sulfolane the acid can be toluenesulfonic acid. Preferentially, higher boiling solvents are combined with higher boiling acids to prevent rapid evaporation in some embodiments.

In a further embodiment, the acid can be a substituent to the Ni-porphyrin, e.g. linked to the porphyrin moiety, preferably linked to the β position of at least one of the pyrrole rings of the Ni-porphyrin, and/or the acid can be a substituent to the aryl substituent groups, which are in meso position of the Ni-porphyrin. The substituent acid preferably is linked to the Ni-porphyrin, e.g. to its pyrrole rings and/or to its aryl substituent groups, via an intermediate linker, which linker has a chain length of at least one atom, preferably of at least 2 atoms or at least 4 or at least 6 atoms. A linker between an acid substituent and a pyrrole moiety of the Ni-porphyrin preferably has a chain length of at least 2 atoms, e.g. of 2 to 18 atoms, e.g. of 4 to 18 atoms or of 6 to 18 atoms, e.g. up to 16 or up to 14 or up to 12 atoms, e.g. a chain length of 1, of 2, of 3, of 4, of 5, of 6, of 7, of 8, or of 9 atoms. The atoms of the linker preferably are C atoms, optionally mono- or dihalogenated, and/or are O atoms. A linker between an acid substituent and an aryl substituent group which is in meso position to the Ni-porphyrin preferably has a chain length of at least 1 atom, e.g. of at least 2 atoms, e.g. of 2 to 18 atoms, e.g. 4 to 12 atoms, which preferably are C atoms, optionally mono- or dihalogenated, and/or O atoms. The atoms of the linker chain preferably are carbon atoms. The linker can be an alkyl chain, which is optionally halogenated, e.g. the chain including or consisting of at least one halogenated methyl group, e.g. a —CF$_2$— group or —CCl$_2$— group. In the alternative to a linker connecting the acid substituent and an aryl substituent group, the acid substituent can directly be bound to the aryl group. Ni-porphyrin having an aryl substituent group in at least one of its meso positions with an acid substituent directly bound to the aryl substituent have the advantage that they can be produced by a more simple synthesis.

The acid can be e.g. a carboxyl group, a sulfidic acid group, e.g. a sulphinic acid group, or a sulphonic acid group. To achieve a pKa of <1 a carboxyl group is preferably directly connected to at least one —CF$_2$— group or fluorinated alkyl group that can form or be part of a linker, a sulfonic acid group can e.g. be connected to either a —CH$_2$— or —CF$_2$— group.

Generally, the composition including the Ni-porphyrin and acid and optionally a solvent can be held on, e.g. adsorbed on or contained in a solid carrier, which can for example be a porous substance or a gel. The porous substance can e.g. be silica or zeolite or cellulose. The gel can e.g. be an acid stable polymer such as polyvinyl alcohol (PVA) or polyvinyl pyrrolidone (PVP). Preferentially, a gel is used, which contains the acid in the polymer backbone. These gels are commercially available as strongly acidic cation exchange resins such as Amberlite® R-120 or Dowex® 50 WX-4.

The organic superbase should be a neutral base that is soluble in organic solvents and should have a pK$_a$>24 in acetonitrile. These bases are from the families of amidines, guanidines, phosphazenes (Schwesinger bases), guanidinophosphazenes or proazaphosphatranes (Verkade's bases). An example for a suitable amidine is 1,8-diazabicyclo[5.4.0]undec-7-ene (DBU, pK$_a$ 24.3). Guanides with sufficient base strengths are for instance 2-t-bu-1,1,3,3-tetramethylguanidine (pk$_a$ 24.3), 7-H-1,5,7-triazabicyclo[4.4.0]dec-5-ene (pK$_a$ 26.0), 7-methyl-1,5,7-triazabicyclo[4.4.0]dec-5-ene (pK$_a$ 25.5) or 1,8-bis(tetramethylguanidino) naphthalene (pK$_a$ 25.1). Most efficient are phosphacene bases (Schwesinger bases), such as t-bu-hexamethylphosphorimidtriamid (P$_1$-t-Bu, pK$_a$ 26.9) or 1,1-(dimethylethyl)tris[tris (dimethylamino) phosphoranylidene]phosphorimidic triamide (P$_4$-t-Bu, pK$_a$ 42.6). 1,1,3,3-Tetramethylguanidine (pK$_a$ 23.3) is not strong enough a base to react with nitramines (hexogene or octogene) (pK$_a$<24, see above). Aqueous solutions of NaOH or KOH are not suitable as well because of long reaction times even at elevated temperatures.

As an alternative to holding the composition on a carrier, the composition can be contacted in the form of droplets with the sample, e.g. by spraying a liquid composition containing the Ni-porphyrin, preferably contacting the composition on a solid carrier, preferably a white carrier, which can e.g. be a wall of a container suspected of containing a sample containing an explosive, or a paper, a plastic, or a glass surface arranged inside the sample or in the vicinity of the sample. In this embodiment, it is preferred that the acid is a substituent to the Ni-porphyrin, which has the advantage of being less irritating, of the Ni-porphyrin that is covalently linked to the acid being less volatile, and/or of being less corrosive than a free acid.

As a carrier containing free acid in the form of a matrix-bound acid, test stripes can be produced by using a strongly acidic cation exchange resin impregnated with the Ni-porphyrin dissolved in halogenated solvent. Dipping the test stripes into the headspace of TATP or EGDN, or direct contact with traces of peroxide- or nitrogen-based explosives, such as triacetone triperoxide (TATP), diacetone diperoxide (DADP), hexamethylene triperoxide diamine (HMDT), methyl ethyl ketone peroxide (MEKP), potassium chlorate (KClO$_3$, potassium bromate (KBrO$_3$), potassium nitrate (KNO$_3$), ammonium nitrate (NH$_4$NO$_3$), urea nitrate (NH$_2$COHNH$_2$+·NO$_3$⁻), nitro glycerine (NG), ethylene glycole dinitrate (EGDN), pentaerythritol tetranitrate (PETN), hexogene (RDX), octogene (HMX), 2,4,6-trinitrophenylmethylnitramine (tetryl) or nitrourea (NH$_2$CONHNO$_2$) leads to a color change from red to green. In case of the nitrogen-based explosives a subsequent color change from green to brown is observed. Detection of explosives is also possible in mixtures such as black powder (KNO$_3$/sulphur/charcoal) or pyrotechnic compositions (e.g. KClO$_3$/Al-powder).

In another aspect of the invention, acid stable porous polymer membranes such as polypropylene membranes, PVC membrane filters, or porous polyvinylidene fluoride, or cellulose, impregnated with the Ni-porphyrin dissolved in pure acid such as trifluoroacetic acid or preferentially higher boiling acids e.g. pentafluoro propionic acid are used as test stripes.

Generally, test stripes can include an inert base material, e.g. a plastic stripe, with an attached porous substance or gel for accommodating the Ni-porphyrin with a bound acid group or in mixture with a free acid. The test stripes can be in combination with free acid and/or an acid stable solvent contained in a container suitable for dispensing liquid, optionally in combination with a superbase, preferable is a separate container suitable for dispensing liquid, as a kit-of-parts. In the alternative to the Ni-porphyrin being included in a test stripe, the Ni-porphyrin in mixture with a free acid or the Ni-porphyrin with a bound acid group, can be present in a liquid composition, preferably in an acid-stable solvent, optionally in combination with a superbase in a separate container suitable for dispensing liquid, as a kit-of-parts. A kit-of-parts contains the compounds and is suitable for carrying out the analytical process of the invention.

Dipping the test stripes into the headspace of TATP or EGDN or direct contact with traces of peroxides, oxyhalide salts, nitrate salts, nitrate esters or nitramines leads to a color change from red to green.

In another aspect of the invention, the acid-substituted Ni-porphyrin dissolved in a solvent is sprayed onto a surface suspected to be contaminated with an explosive. A change of color from red to green would indicate the presence of an explosive. Alternatively, one can take a swab of a surface using a wiping cloth and apply the spray to the wiping cloth.

The Ni-porphyrin can include or consist of one of Structures 1 to 3, wherein Structure 1 shows an embodiment in which the Ni-porphyrin is substituted with aryl substituent groups (Ar) in all four of the meso positions. Exemplary aryl substituent groups can be independently selected from a phenyl or other aromatic rings (Ar), which aryl group optionally is further substituted by at least one electron donating group, herein shown as a methoxy group, e.g. as shown one methoxy group or three methoxy groups, and shown as three methyl groups. Exemplary aryl groups (Ar) are the phenyl group, a methoxy phenyl group, a tri-methoxy phenyl group, and a trimethyl phenyl group. The aryl group can be bound by any of its carbon atoms to the carbon in meso position of the Ni-porphyrin. Generally preferred in the embodiment of the acid being covalently linked to the Ni-porphyrin, at least one, e.g. one, two, three or all four of the substituent groups in meso position to the Ni-porphyrin is substituted with at least one acid group, e.g. at least one acid group is covalently linked to at least one of the aryl groups in meso position of the Ni-porphyrin.

Structure 1

Structure 2 chain ≥ 1 C atoms
e.g.: —(CH$_2$)$_7$—,
—(CF$_2$)$_7$—,
acid: CO$_2$H, SO$_3$H

Structure 3

X = CH$_2$, CF$_2$, O

Structure 2 shows an embodiment, in which all four meso positions of the Ni-porphyrin are substituted with an aryl group (Ar).

In an embodiment, although less preferred, the aryl substituent groups do not carry an electron donating group. In this embodiment of the aryl substituent groups being free from electron donating groups, the analytical process is slower to generate the indicating color, and the process is less sensitive.

Optionally, but less preferably, the acid is directly linked to the Ni-porphyrin, especially directly linked to the aryl group of the Ni-porphyrin, i.e. without an intermediate linker, e.g. for the acid being a strong acid, e.g. —SO$_3$H. Preferably, the acid is linked to the Ni-porphyrin by an intermediate linker, which can have a chain length of at least one atom, preferably of at least 2, of at least 3, of at least 4, of at least 5, or, more preferably, of at least 6 or at least 7 atoms, e.g. of up to 12 or up to 10 or up to 8 atoms, which are e.g. C-atoms, optionally mono- or dihalogenated, and/or O-atoms forming ether linkages. Generally preferred, for the acid group being —CO$_2$H, the acid is linked by a linker having at least one —CF$_2$— group directly adjacent the acid group. Generally preferably, the linker can include or consist of methylene groups, of ether linkages, of difluoro methylene groups, of dichloro methylene groups, or of combinations of at least two of these.

Structure 1 is suitable for an embodiment, in which the composition includes the Ni-porphyrin and, as a compound in admixture with the Ni-porphyrin, an acid, optionally a solvent.

Figure 2:
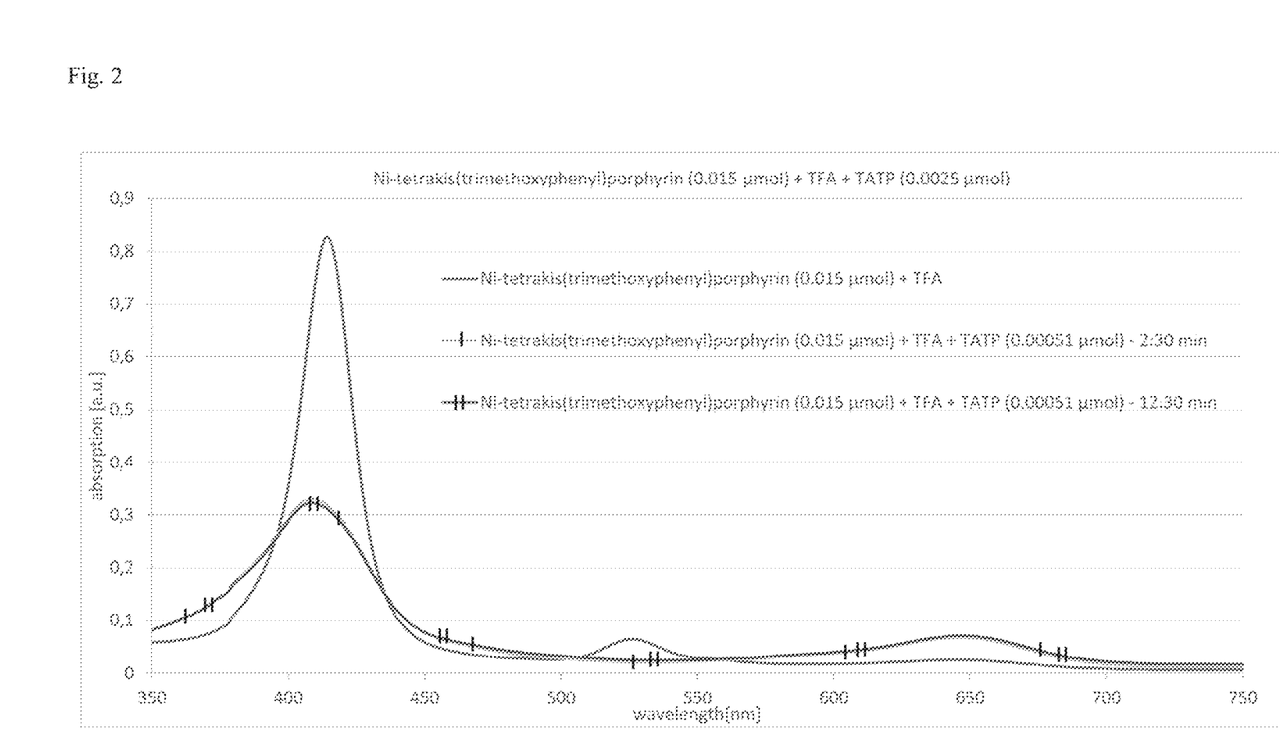

Structure 2 and Structure 3 show embodiments, in which the acid is a substituent to the Ni-porphyrin. In Structure 2, the acid (acid) is covalently linked to a pyrrole ring of the Ni-porphyrin directly ($X_n$ with n=0) or by an intermediate linker (chain), which has a chain length of 1 up to 10 atoms ($X_n$ with n up to 10), e.g. at least 2 atoms, preferably C-atoms, and wherein the linker chain can contain or consist of methylene groups (—CH$_2$—) and/or contain or consist of difluoro methylene groups (—CF$_2$—) and/or dichloro methylene groups (—CCl$_2$—) and/or ether linkages (—O—). By way of examples, the acid substituent is shown as a carboxyl group (CO$_2$H), or as a sulphonic acid group (SO$_3$H). In the embodiment of FIG. 2, up to 8 positions can carry acid groups, e.g. 1, 2, 3 or 4 or more of the positions can carry acid groups, wherein these positions are the β positions of the Ni-porphyrin.

As shown in Structure 3, at least one acid (acid) can generally be covalently linked to an aryl group in meso position by an intermediate linker having a chain length shown here as having at least 1 atom, e.g. up to 10 atoms ($X_n$ with n from 1 up to 10), e.g. a chain length of at least 2 atoms, e.g. of 3 to 6 atoms, preferably C-atoms. For the exemplary phenyl ring as the electron donating aryl substituent (Ar), the acid is either directly bound, or by the linker in any position of the aryl group, depending e.g. on the number of acid or linker substituents to the aryl group, preferably in ortho or para position, in two meta positions, or in two meta positions and in para position of the phenyl group as the exemplary aryl substituent. Herein also, the linker chain can contain or consist of O groups forming ether bonds, of methylene groups (—CH$_2$—) and/or contain or consist of difluoro methylene groups (—CF$_2$—) and/or dichloro methylene groups (—CCl$_2$—) and/or ether linkages (—O—). The porphyrin can e.g. carry between one and eight acid groups. Generally, the acid bound to the Ni-porphyrin preferably has a pKa of −1.2 to 0.23, e.g. the acid is —SO$_3$H or —CO$_2$H, preferably with a linker of at least one difluoro methylene group directly adjacent the acid which is —CO$_2$H or —SO$_3$H.

Figure 1:
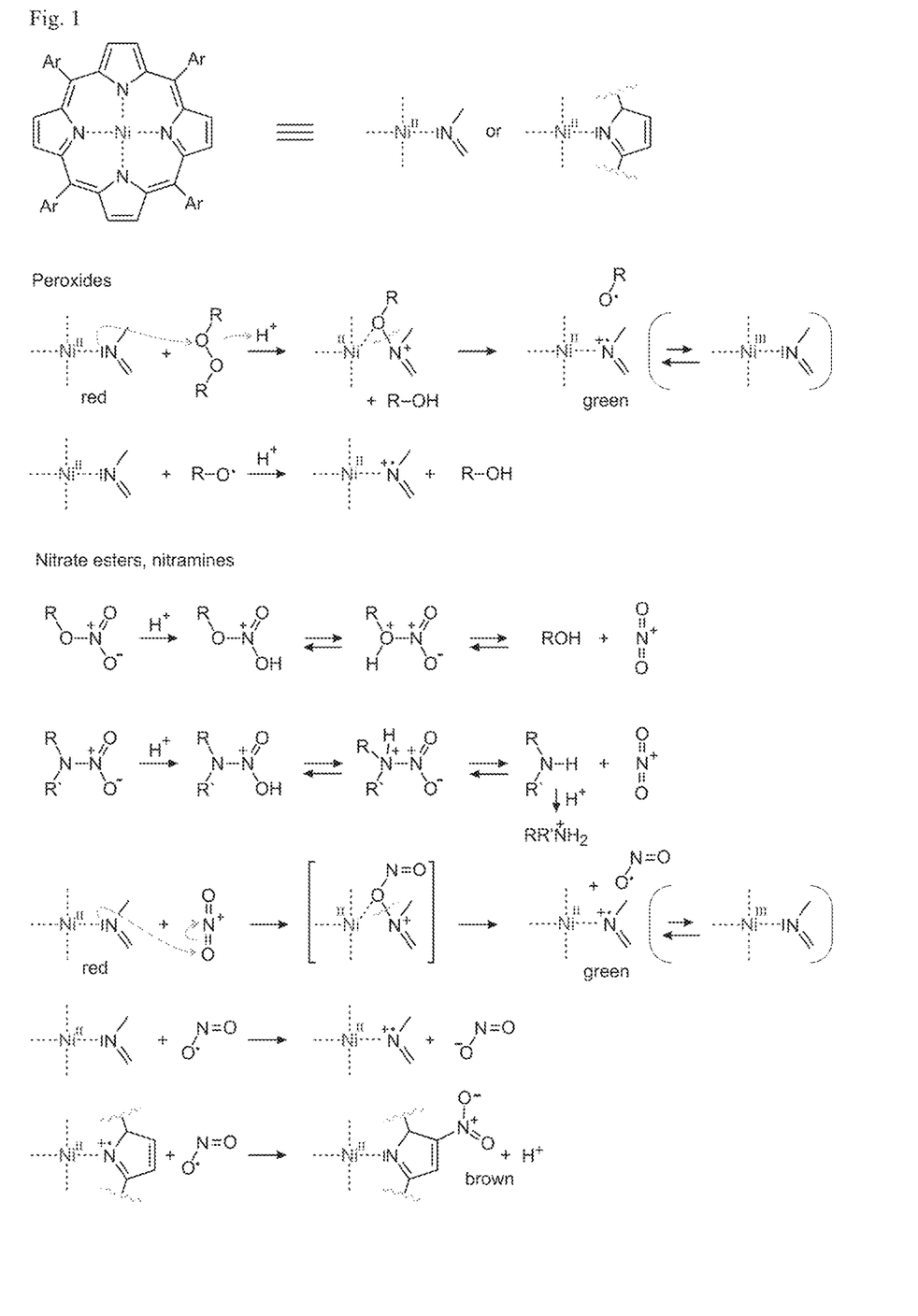

At present, the reaction mechanism is assumed to be as depicted in FIG. 1, wherein in the reaction with the peroxide (R—O—O—R), the reactive $Ni^{2+}$ ($Ni^{II}$) of the Ni-porphyrin is shown with only a portion of the porphyrin. For the sake of simplicity, the unpaired electron and the positive charge of the porphyrin radical cation are shown as being located at the pyrrole nitrogen, and not delocalized over the π system of the porphyrin.

Therein, the color change is based on a one-electron oxidation of the porphyrin. Each peroxide unit upon reaction accepts 2 electrons and hence one molecule of TATP or HMTD, including 3 peroxide units, oxidizes 6 porphyrin molecules. Further enhancement of the sensitivity involves a radical chain reaction initiated by RO· and involving ambient air oxygen as the oxidizing agent. Oxidizing species in case of the detection of nitramines and nitrate esters are the protonated species or the nitronium ions eliminated thereof. The acid cleavage corresponds to the reverse process of the synthesis of nitramines and nitrate esters. The nitronium ions ($NO_2^+$) thereby are reduced to nitrogen dioxide ($NO_2$), which oxidizes another equivalent of the red porphyrin to the green porphyrin radical cation and being reduced the nitrite anion ($NO_2^-$). When the red porphyrin is consumed, the nitrogen dioxide reacts with the green porphyrin radical cation via radical recombination forming a brownish nitrated porphyrin. (see e.g. M. M. Catalano, M. J. Crossley, M. M. Harding, L. G. King, Control of Reactivity at the Porphyrin Periphery by Metal Ion Co-ordination: a General Method for Specific Nitration at the β-Pyrrolic Position of 5,10,15,20-Tetraarylporphyrins. Chem. Commun. 1984, 1535-1536) This explains the color change by the process and device of the invention when in contact with a peroxide-based explosive generates a change of color from red to green, and when in contact with a nitrate-based or a nitramine-based explosive, a change of color from red to green and finally to brown, which is characteristic only for the nitrogen-based explosives, and which allows to distinguish between peroxide- and nitrogen-based explosives (see examples).

In order to discriminate between hydrogen peroxide and cyclic peroxides such as TATP and HMTD, a weaker acid such as dichloroacetic acid ($pK_a$ 1.3) can be employed, which is not able to hydrolyse the cyclic peroxides but which is strong enough to activate hydrogen peroxide. To avoid false positives from hydrogen peroxide in practical applications, two test stripes are used: one with a strong acid to detect all peroxides and one with a weaker acid to detect only hydrogen peroxide. The weak acid can e.g. have a $pK_a$ of 1.2 to 2.

Optionally, the process can consist of contacting the sample with the composition, or the process can include an additional step of destroying free hydrogen peroxide from the sample prior to contacting the sample with the composition in order to reduce or eliminate the influence of free hydrogen peroxide. For hydrolysing free hydrogen peroxide, prior to contacting the sample with the composition including Ni-porphyrin, the sample can be contacted with a reactant having activity to disintegrate free hydrogen peroxide. Accordingly, the device can optionally include a flow path in which the composition including the Ni-porphyrin is arranged to receive a sample, wherein upstream of this composition there is arranged a reactant having activity to disintegrate free hydrogen peroxide. The reactant can e.g. be an inorganic catalyst, e.g. $KMnO_4$ or $MnO_2$. The reactant can be immobilized on a porous carrier that optionally spans the cross-section of the flow path.

A flow path can e.g. be provided by a wicking action material, e.g. a porous material, and/or by a duct through which a sample can migrate, e.g. by capillary action or by positive or negative pressure applied to the duct.

Example 1: Detecting Solid TATP from the Head Space

A plastic stripe (90×5 mm) equipped with a cellulose pad (5×5 mm) at one end, impregnated with Ni-tetrakis(3,4,5-trimethoxyphenyl) porphyrin by dropping 5 µL of a 1 mM solution of the porphyrin in toluene onto the cellulose pad and then the solvent is removed by evaporation. The stripe prepared in this way is moistened with a drop of 5-10 µL of perfluoropentanoic acid. The addition of the acid to the Ni-porphyrin compound of the invention herein is also referred to as activating the Ni-porphyrin or the stick. The activated stick is brought into close proximity, ca.~3 mm to crystals of TATP present on an uncovered surface or into the headspace of TATP present in a small glass vial. After 15 s the red color of the pad turns into green. Assuming a saturation vapour pressure in the head space of the solid explosive and a volume of 3 mL of gas, 8 nmol of TATP can be detected.

Example 2: Detecting Organic Nitrates (e.g. PETN, EGDN, NG), and Nitrate Salts (e.g. $NH_4NO_3$, $KNO_3$, $NaNO_3$) from the Head Space Traces of these compounds, PETN, EGDN, NG, and nitrate salts (e.g. $NH_4NO_3$, $KNO_3$, $NaNO_3$) each separately present on an uncovered surface, or in a small glass vial are treated with a drop (5-10 µl) of perfluoropentanoic acid. After several seconds, the activated plastic stripe prepared as in Example 1 is brought into close proximity (~3 mm) to one of the compounds present on the surface or into the head space of the glass vial. The color of the pad turns from red to brown. The detection of nitrate salts by the invention is obtained also when the nitrate salts are present in solution or in a dry mixture, e.g. with sulfur and charcoal as in black powder.

Example 3. Detecting Nitramines (e.g. Hexogen, Octogen, Nitrourea) from the Head Space Separately, traces of solid nitramines on a surface or in a small glass vial are moistened with a drop (5-10 µl) of a solution of an organic superbase (e.g. 20 vol. % $P_1$-t-Bu in dissolved in acetonitrile). Then a drop (5-10 µl) of perfluoropentanoic acid is applied to the same spot. The activated stripe prepared as in Example 1 is brought into close proximity (~3 mm) of the suspension of one of the nitramine compounds in the organic superbase on the surface or into the headspace of the glass vial. The color of the pad immediately turns from red to brown.

Example 4: Detecting Peroxides (e.g. HMTD, TATP), Chlorates (e.g. $KClO_3$, $NaClO_3$), and Bromates (e.g. $KBrO_3$, $NaBrO_3$) in the Solid State The activated stripe (prepared as in Example 1) is separately brought into contact with traces of solid HMDT, TATP, or chlorate by swiping a contaminated surface. The color of the stripe immediately changes from red to green at the spots, where the pad comes into contact with traces of the solid explosive. These green spots spread out and within about 30 seconds the pad turns green. 10 µl of a 12.65 µM solution of TATP dissolved in dichloromethane were dropped as a round spot onto the previously prepared test stripe. After one minute the test stripe turned light green. Using this method, it is possible to detect 0.125 nmol (28 ng) TATP.

Figure 3:
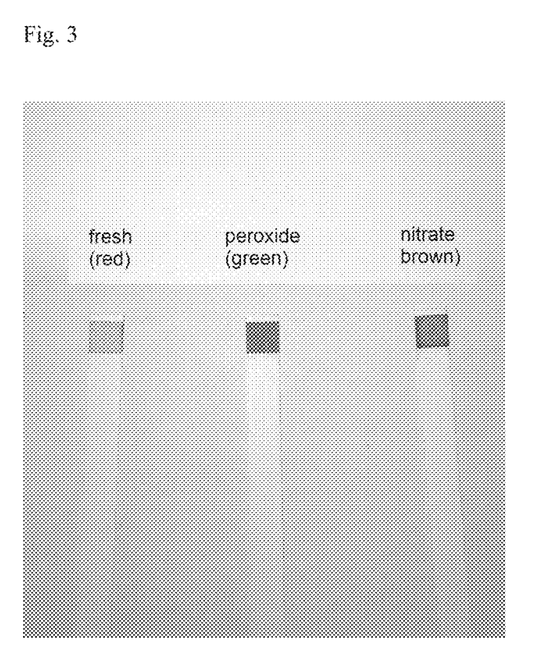

FIG. 3 shows a plastic stripe with a terminally attached cellulose pad impregnated with Ni-porphyrin according to the invention, prior to contact with a compound to be detected (fresh (red)), and a plastic stripe containing the same Ni-porphyrin, activated by adding acid and after contact with peroxide (peroxide (green)), and a plastic stripe containing the same Ni-porphyrin activated by adding acid and after contact with nitrate (nitrate (brown)).

Example 5: Detecting Organic Nitrates (e.g. PETN, EGDN, NG), and Nitrate Salts (e.g. $NH_4NO_3$, $KNO_3$, $NaNO_3$) in the Crystalline State or as Neat Liquids The activated stripe prepared as in Example 1 is brought into contact with separate traces of solid nitrate salts or organic nitrates (PETN is a solid, EDGN and NG are liquids) by swiping a contaminated surface. The color of the stick immediately changes from red to green at the spots, where the pad comes into contact with traces of the explosive. These green spots turn brown and spread out over the pad.

Example 6: Detecting Nitramines (e.g. Hexogen, Octogen, Nitrourea) in the Solid State Separately, traces of solid nitramines are moistened with a drop (5-10 μl) of a solution of an organic superbase (e.g. $P_1$-t-Bu) in acetonitrile (20 vol. % $P_1$-t-Bu). The activated stripe (prepared as in Example 1) is brought into contact with the suspension. The color of the pad immediately turns from red to brown.

Comparative Example 1: Detecting Nitrotoluenes (e.g. 2,4-dinitrotoluene, 2,4,6-trinitrotoluene)

Separate traces of these explosives, e.g. of 2,4-dinitrotoluene or of 2,4,6-trinitrotoluene, are brought into contact with an organic superbase (e.g. a solution of 20 vol. % of $P_1$-t-Bu in acetonitrile). The solution turns immediately from colorless to deep violet (TNT) or deep blue (DNT). In this case the activated stripe is not needed.

Example 7: Detecting HMTD and TATP from Solution

For detection of HMTD and/or TATP in solution, 300 μL of Ni-tetrakis(3,4,5-trimethoxyphenyl) porphyrin (50 μM in $CH_2Cl_2$) and 50 μL trifluoroacetic acid (13 M) were transferred into a sample tube. After adding 10 μL of a 25.3 μM solution (HMTD or TATP separately in $CH_2Cl_2$), the solution turned green within several minutes due to the formation of the porphyrin x-radical cation. It was calculated that the process can detect 0.18 nmol (40 ng) TATP or (50 ng) HMTD as a color change from red to green.

Analogously, the detection limit of potassium perchlorate ($KClO_3$) was determined as 270 ng, and the detection limit of ammonium nitrate ($NH_4NO_3$) is 85 ng, Example 8: Synthesis of Structure 2, Chain: $CH_2(CF_2)_6$, Acid Group: $CO_2H$ The 2,2,3,3,4,4,5,5,6,6,7,7-dodecafluorooctane-1,8-diol was prepared according to a formulation by V. Montanari, K. Kumar, Eur. J. Org. Chem. 2006, 4, 874-877 with tosyl chloride and triethylamine to give the singly tosylated species 2,2,3,3,4,4,5,5,6,6,7,7-dodecafluoro-8-hydroxyoctyl 4-methylbenzenesulfonate. The 2,2,3,3,4,4,5,5,6,6,7,7-dodecafluoro-8-iodooctan-1-ol was obtained by reaction with potassium iodide (synthesized according to V. Montanari, K. Kumar, Eur. J. Org. Chem. 2006, 4, 874-877). The reaction with (2,2,6,6-Tetramethylpiperidin-1-yl)oxyl (TEMPO), potassium bromide and sodium hypochlorite gave 2,2,3,3,4,4,5,5,6,6,7,7-dodecafluoro-8-iodooctanoic acid (adapted from J. Ignatowska, O. Shyshkov, T. Zipplies, K. Hintzer, G.-V. Röschenthaler, J. Fluor. Chem. 2012, 141, 35-40). This was reacted in an acid-catalyzed esterification with methanol to give the methyl 2,2,3,3,4,4,5,5,6,6,7,7-dodecafluoro-8-iodooctanoate. The subsequent reaction with a Ni-porphyrin, sodium dithionite and sodium bicarbonate provides the porphyrin substituted with a perfluorinated acid in β-position (adapted from L. M., Jin, Z. Zeng, C.-C. Guo, Q.-Y. Chen, J. Org. Chem. 2003, 68, 3912-3917).

Another way to bind the acid to the porphyrin is a Suzuki-Miyaura coupling with a porphyrin that has pinacol esters or boronic acids in the beta position (based on Y. Zhao, J. Hu, Angew. Chem. Int. Ed. 2012, 51, 1033-1036). This porphyrin was obtained by bromination with N-bromosuccinimide (NBS) (according to T. Hu, T. Liu, C. Hu, J. Lang, J. Porphyr. Phthalocyanines 2018, 22, 751-757) and subsequent reaction with bis(pinacolato)diborone, potassium acetate and [1,1'-bis(diphenylphosphino)ferrocene] palladium (II) dichloride (in modified form according to G. Bringmann, D. C. G. Götz, T. A. M. Gulder, T. H. Gehrke, T. Bruhn, T. Kupfer, K. Radacki, H. Braunschweig, A. Heckmann, C. Lambert, J. Org. Chem. 2008, 130, 17812-17825). In the final step, the acid is obtained by base-catalyzed ester saponification. The reaction is schematically depicted below:

Example 9: Synthesis of Structure 3, Chain: $CH_2(CF_2)_2$, Acid: $CO_2H$

Starting from 2,2,3,3-tetrafluorobutane-1,4-diol, the singly tosylated species 2,2,3,3-tetrafluoro-4-hydroxybutyl 4-methylbenzenesulfonate was obtained by the reaction with tosyl chloride and triethylamine (synthesized according to V. Montanari, K. Kumar, Eur. J. Org. Chem. 2006, 4, 874-877). This compound was converted into the 2,2,3,3-tetrafluoro-4-iodobutan-1-ol by reaction with potassium iodide (adapted from V. Montanari, K. Kumar, Eur. J. Org. Chem. 2006, 4, 874-877). The 2,2,3,3-tetrafluoro-4-iodobutanoic acid was generated by reaction with (2,2,6,6-tetramethylpiperidin-1-yl)oxyl (TEMPO), potassium bromide and sodium hypochlorite (according to J. Ignatowska, O. Shyshkov, T. Zipplies, K. Hintzer, G.-V. Röschenthaler, J. Fluor. Chem. 2012, 141, 35-40). Through an acid-catalyzed reaction in methanol, the acid is converted to the methyl ester.

Starting from the 3,4,5-trimethoxybenzaldehyde, the 2-bromo-3,4,5-trimethoxybenzaldehyde was obtained by bromination with N-bromosuccinimide (NBS) (synthesized according to R. Labruère, P. Helissey, S. Debène-Finck, S. Giorgi-Renault, Lett. Org. Chem. 2012, 9, 568-571). Subsequently, the aldehyde is protected with ethane-1,2-diol and p-toluenesulfonic acid as acetal. This offers the possibility to perform a lithium-halogen exchange with tert-butyllithium. Then trimethylborate is added and the compound is deprotected by addition of hydrochloric acid to give (6-formyl-2,3,4-trimethoxyphenyl) boronic acid (according to G. Besong, D. Billen, I. Dager, P. Kocienski, E. Sliwinski, L. R. Tai, F. T. Boyle, Tetrahedron 2008, 64, 4700-4710). This compound was converted in a Suzuki-Miyaura coupling with methyl 2,2,3,3-tetrafluoro-4-iodobutanoate to give methyl 2,2,3,3-tetrafluoro-4-(6-formyl-2,3,4-trimethoxyphenyl) butanoate (based on Y. Zhao, J. Hu, Angew. Chem. Int. Ed. 2012, 51, 1033-1036).

Subsequently, the porphyrin is obtained in an acid-catalyzed condensation reaction followed by oxidation by 2,3-dichloro-5,6-dicyano-1,4-benzoquinone (DDQ) (according to J. S. Lindsey, K. A. MacCrum, J. S. Tyhonas, Y. Y. Chuang, J. Org. Chem 1994, 59, 579-587). The metallation with nickel acetylacetonate was carried out according to a prescription by M. Dommaschk, F. Gutzeit, S. Boretius, R. Haag, R. Herges, Chem. Commun. 2014, 50, 12476-12478 and the acid was subsequently released by basic ester saponification.

The reaction is schematically depicted below:

Example 10: Swab Test for the Detection of TATP

A solvent and acid resistant wiping cloth (e.g. hydrophilized polypropylene) is used to swab a surface contaminated with TATP. A solution of 0.5 mg of the Ni-porphyrin with a $(CF_2)_8$ linker and a $CO_2H$ group as acid (Structure 2, preparation see Example 8) dissolved in 10 ml of chloroform is sprayed onto the wiping cloth. A color change from red to green indicates a contamination with TATP or another peroxide or a nitramine or nitrate based explosive.

Example 10: Practical Implementation of the Test

A plastic stripe (90×5 mm) is equipped with a cellulose pad (5×5 mm) at one end. The pad is moistened with a solution of the Ni-porphyrin in an organic solvent. The solvent is evaporated leaving the dry pad uniformly impregnated with the red colored porphyrin. This stick is storable for extended periods of time (>2 years at room temperature in a dry environment). Prior to application, the stripe is activated with a drop (5-10 μL) of perfluoropentanoic acid applied onto the pad. The stripe now remains active and ready to use for about 15 min. The acid can be applied from a dropper bottle, or released from a reservoir above the pad by mechanical force. In these examples, the following detection limits could be determined: for TATP: ~40 ng, for $KClO_3$: ~270 ng, for $NH_4NO_3$: ~85 ng, for urea nitrate: ~350 ng, for HMTD: ~50 ng.

Comparative Example 1

For comparative purposes, electron rich Ni-porphyrins (Ni-tetra(4-hydroxyphenyl) porphyrins) have been prepared according to M. K. Chahal, M. Sankar, Dalton Trans. 2016, 45, 16404-16412 and used as sensors for cyanide ($CN^-$), fluoride ($F^-$) and picric acid according to M. K. Chahal, M. Sankar, Dalton Trans. 2017, 46, 11669-11678. To the Ni-porphyrins used in these publications, trifluoroacidic acid (TFA) and TATP and HMDT was added. After one minute at room temperature an unspecific reaction took place. Hence, these porphyrins described by Chahal et al. are not suitable for the detection of peroxide-based explosives.

Comparative Example 2

Ni-tetra(carboxyphenyl) porphyrins with $CO_2H$ groups directly attached to the meso phenyl rings in 2, 3 or 4 position (B. Du, A. Langlois, D. Fortin, C. Stern, P. D. Harvey, J. Clust. Sci. 2012, 23, 737-751) are not suitable, and it is assumed that this is because the carboxylic group is not sufficiently acidic ($pK_a$ 4.2) to cleave peroxide or nitrate based explosives. Ni-tetrakis(4-carboxyphenyl)porphyrin (CAS #136300-60-2) was synthesized (B. J. Johnson et al. Sensors 2010, 10, 2315-2331) and dissolved in methylene chloride. TATP and HMDT was added. No color change was observed.

The invention claimed is:

1. An analytical process for detecting compounds in a sample suspected of containing a peroxide-based compound, a nitrate-based compound, a nitrotoluene-based compound, or a nitramine-based compound, the process comprising treating the sample with a superbase and then contacting the sample with a composition, wherein the composition comprises or consists of a Ni-porphyrin and an acid.

2. The analytical process according to claim 1, wherein the sample is suspected to contain a compound that is an explosive.

3. The analytical process according to claim 1,
wherein the peroxide-based compound is one or more than one of the following: triacetone triperoxide (TATP), diacetone diperoxide (DADP), methyl ethyl ketone peroxide (MEKP), and/or hexamethylene triperoxide diamine (HMTD),
wherein the nitrate-based compound is potassium nitrate ($KNO_3$), ammonium nitrate ($NH_4NO_3$), urea nitrate ($NH_2COHNH_2+\cdot NO_3^-$), nitroglycerine (NG), ethylene glycol dinitrate (EGDN), and/or pentaerythritol tetranitrate (PETN),
wherein the nitrotoluene-based compound is 2,4-dinitrotoluene (DNT) or 2,4,6-trinitrotoluene (TNT), and
wherein the nitramine-based compound is 1,3,5-trinitro-1,3,5-triazinane (hexogen, RDX), 1,3,5,7-tetranitro-1,3,5,7-tetrazoctane (octogen, HMX), or 2,4,6-trinitrophenylmethylnitramine (tetryl).

4. The analytical process according to claim 1, wherein the superbase is an organic superbase.

5. The analytical process according to claim 1, wherein the superbase is an organic superbase, and wherein the nitrate-based compound includes organic nitrates.

6. The analytical process according to claim 1, wherein the composition contains an acid-stable solvent.

7. The analytical process according to claim 1, wherein the acid is not covalently linked to the Ni-porphyrin.

8. The analytical process according claim 1, wherein the composition is held by a carrier, wherein the carrier comprises a porous acid-stable material and/or a swelling liquid adsorbing acid-stable material, the carrier forming a supporting material for a liquid composition containing the Ni-porphyrin and the acid.

9. The analytical process according to claim 1, wherein the composition comprises or consists of the Ni-porphyrin, the acid and an acid-stable solvent, and the composition is liquid.

10. The analytical process according to claim 1,
wherein peroxide-based compounds are indicated by the Ni-porphyrin finally generating green color,
wherein the nitrate-based compound comprises an inorganic nitrate compound or an organic nitrate compound,
wherein the inorganic nitrate compound is indicated by the Ni-porphyrin and a strong acid generating a brown color, and the nitramine-based compound and the organic nitrate compound are indicated by the Ni-porphyrin and the strong acid initially generating green color and subsequently generating brown color.

11. The analytical process according to claim 1, wherein the acid has a pKa of −2.8 to 1.2.

12. The analytical process according to claim 11, wherein the acid is not covalently linked to the Ni-porphyrin.

13. The analytical process according to claim 1, wherein the composition is held on a carrier that is porous and/or swelling.

14. The analytical process according to claim 1, wherein the composition comprises an acid-stable solvent.

15. The analytical process according to claim 1, wherein the Ni-porphyrin is substituted in at least one of its meso positions with at least one aryl group, which is substituted with at least one electron-donating group.

16. The analytical process according to claim 1, wherein the composition consists of a Ni-porphyrin and a strong acid.

17. An analytical process for detecting compounds in a sample suspected of containing a peroxide-based compound, the process comprising
separating the sample into portions and contacting one of the portions with a first composition that comprises or consists of a Ni-porphyrin and a strong acid and contacting another portion of the sample with a second composition that comprises or consists of a Ni-porphyrin and a weaker acid,
wherein the first composition is used to detect all peroxides, and the second composition is used to detect only hydrogen peroxide.

18. The analytical process according to claim 17, wherein the Ni-porphyrin of the first composition is present on a porous carrier that is attached to a plastic strip, in combination with a container containing the strong acid as a liquid.

* * * * *